United States Patent
Sadka et al.

(10) Patent No.: US 10,359,281 B2
(45) Date of Patent: Jul. 23, 2019

(54) SYSTEM AND METHOD FOR GENERATING CANVAS REPRESENTATIONS REFLECTING SOLAR INSTALLATION POTENTIAL OF A GEOGRAPHIC AREA

(71) Applicant: Solview Systems Ltd., Ramat Gan (IL)

(72) Inventors: Ofer Sadka, Ramat Gan (IL); Amnon Krupnik, Ramat Gan (IL)

(73) Assignee: Solview Systems Ltd., Ramat Gan (IL)

( * ) Notice: Subject to any disclaimer, the term of this patent is extended or adjusted under 35 U.S.C. 154(b) by 0 days.

(21) Appl. No.: 15/822,880

(22) Filed: Nov. 27, 2017

(65) Prior Publication Data

US 2018/0135983 A1    May 17, 2018

Related U.S. Application Data

(63) Continuation of application No. PCT/US2016/034644, filed on May 27, 2016, which
(Continued)

(51) Int. Cl.
*G01C 21/00* (2006.01)
*G01C 11/00* (2006.01)
(Continued)

(52) U.S. Cl.
CPC .......... *G01C 11/00* (2013.01); *G06K 9/00476* (2013.01); *G06K 9/00637* (2013.01);
(Continued)

(58) Field of Classification Search
CPC .................................. G06K 9/00; G01C 11/00
(Continued)

(56) References Cited

U.S. PATENT DOCUMENTS

| | | |
|---|---|---|
| 4,235,222 A | 11/1980 | Ionescu |
| 7,305,983 B1 | 12/2007 | Meder et al. |

(Continued)

FOREIGN PATENT DOCUMENTS

| | | |
|---|---|---|
| CN | 101918767 A | 12/2010 |
| EP | 2202483 A1 | 6/2010 |
| WO | 2007127864 A2 | 11/2007 |

OTHER PUBLICATIONS

First Office Action from the State Intellectual Property of the P.R.C. for Patent Application 201380053897.8, Issue Document No. 2016061601895100, dated Jun. 21, 2016.
(Continued)

*Primary Examiner* — Abolfazl Tabatabai
(74) *Attorney, Agent, or Firm* — M&B IP Analysts, LLC

(57) ABSTRACT

A system and method for generating canvas representations of solar panel installation potential in a geographic area. The method includes: identifying, based on at least one location parameter, a plurality of addresses, wherein the at least one location parameter represents a geographic area including the plurality of addresses; extracting an image of a geographic area including the plurality of addresses; causing a determination of an installation layout for the plurality of addresses based on the extracted image; causing a generation of at least one solar analytic for each of the plurality of addresses based on the determined installation layout; and generating, based on the installation layout and the at least one solar analytic for each address, a canvas representation for the geographic area.

19 Claims, 6 Drawing Sheets

Related U.S. Application Data is a continuation-in-part of application No. 14/626,300, filed on Feb. 19, 2015, now Pat. No. 9,690,987, which is a continuation of application No. PCT/IL2013/050715, filed on Aug. 25, 2013.

(60) Provisional application No. 62/166,745, filed on May 27, 2015, provisional application No. 61/693,787, filed on Aug. 28, 2012.

(51) Int. Cl.
*G06T 11/60* (2006.01)
*G06Q 10/06* (2012.01)
*G06K 9/46* (2006.01)
*G06K 9/00* (2006.01)
*F24S 20/00* (2018.01)

(52) U.S. Cl.
CPC ......... *G06K 9/469* (2013.01); *G06Q 10/0631* (2013.01); *G06T 11/60* (2013.01)

(58) Field of Classification Search
USPC ....................................................... 382/113
See application file for complete search history.

(56) References Cited

U.S. PATENT DOCUMENTS

| | | | |
|---|---|---|---|
| 7,500,391 B2 | 3/2009 | Woro | |
| 7,516,557 B2 | 4/2009 | Courier | |
| 7,832,267 B2* | 11/2010 | Woro | G06F 17/5004 73/170.27 |
| 8,078,436 B2 | 12/2011 | Pershing et al. | |
| 8,170,840 B2 | 5/2012 | Pershing | |
| 8,417,061 B2* | 4/2013 | Kennedy | G06K 9/0063 382/286 |
| 8,437,554 B2 | 5/2013 | Kim et al. | |
| 2006/0137736 A1 | 6/2006 | Nishitani et al. | |
| 2008/0105045 A1 | 5/2008 | Woro | |
| 2009/0234692 A1 | 9/2009 | Powell et al. | |
| 2009/0304227 A1 | 12/2009 | Kennedy et al. | |
| 2011/0205245 A1 | 8/2011 | Kennedy et al. | |
| 2012/0121125 A1 | 5/2012 | Dimov | |
| 2012/0159596 A1 | 6/2012 | Vandevelde et al. | |
| 2012/0193512 A1 | 8/2012 | Wu et al. | |
| 2012/0222500 A1 | 9/2012 | Riess et al. | |
| 2013/0146123 A1 | 6/2013 | Park | |
| 2013/0148100 A1 | 6/2013 | Magnussen et al. | |
| 2013/0152998 A1 | 6/2013 | Herzig et al. | |
| 2013/0166266 A1 | 6/2013 | Herzig et al. | |

OTHER PUBLICATIONS

Patent Cooperation Treaty International Search Report for PCT/IL2013/050715, dated Dec. 24, 2014, Israel Patent Office, Jerusalem, Israel.

Second Office Action from the State Intellectual Property of the P.R.C. for Patent Application 201380053897.8, Issue Document No. 2017042600992620, dated May 2, 2017.

The International Search Report and The Written Opinion of the International Searching Authority for PCT/US2016/034644, ISA/RU, Moscow, RU, dated Sep. 8, 2016.

\* cited by examiner

SYSTEM AND METHOD FOR GENERATING CANVAS REPRESENTATIONS REFLECTING SOLAR INSTALLATION POTENTIAL OF A GEOGRAPHIC AREA

CROSS-REFERENCE TO RELATED APPLICATIONS

This application is a continuation of International Application No. PCT/US2016/034644 filed on May 27, 2016 which claims the benefit of U.S. Provisional Patent Application No. 62/166,745 filed on May 27, 2015. This application is a continuation-in-part (CIP) of U.S. patent application Ser. No. 14/626,300 filed on Feb. 19, 2015, now pending, which is a continuation of International Patent Application No. PCT/IL2013/050715 filed on Aug. 25, 2013, which claims the benefit of U.S. Provisional Patent Application No. 61/693,787 filed on Aug. 28, 2012. The contents of the above-referenced applications are hereby incorporated by reference.

TECHNICAL FIELD

The present disclosure relates generally to evaluating potential solar panel installation sites, and more particularly to identifying potential solar panel installation sites for evaluation.

BACKGROUND

Energy demands are increasing worldwide, and sources of energy are becoming increasingly difficult to obtain. Moreover, these sources of energy require enhanced technology for recovery. In addition to various conventional sources of energy, many alternative sources are available. These alternative sources include hydroelectric, thermal, and mechanical transfers of energy, wind power, and solar power. To meet the increasing world energy demand, increased use of solar energy is inevitable.

The effectiveness of solar energy systems for generating electricity depends upon the particular site in which solar energy is utilized. Specifically, solar energy is frequently gathered and distributed via one or more solar panels. Such solar panels require optimal access to sunlight in order to provide maximal solar energy. To this end, those seeking to install solar panels seek the optimal position and direction for each solar panel.

Visual and manual assessments provide an indication as to the efficiency and effectiveness of a given site for solar energy, but are labor intensive. Existing solutions for evaluating potential placements for solar panels may involve using various instruments and climbing or otherwise physically traversing each potential surface to profile the solar power potential. The evaluation may further take into account the effects of shade caused by other structures and objects. Nonetheless, the process may be time-consuming and expensive.

Thus, salespeople and other individuals attempting to estimate the suitability of a given address for installation of solar panels currently lack an effective tool for efficiently pre-evaluating the suitability of a geographic area generally and, in particular, addresses prior to performing assessment tests. As a result, such individuals may end up visiting several irrelevant addresses in search of a suitable addresses for installation when the likelihood of actually installing solar panels in those addresses is low.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The embodiments disclosed herein include a method for generating canvas representations of solar panel installation potential in a geographic area. The method includes: identifying, based on at least one location parameter, a plurality of addresses, wherein the at least one location parameter represents a geographic area including the plurality of addresses; extracting an image of a geographic area including the plurality of addresses and particular images of each of the addresses; causing a determination of an installation layout for each of the plurality of addresses based on the extracted image of the address; causing a generation of at least one solar analytic for each of the plurality of addresses based on the determined installation layout; and generating, based on the installation layout and the at least one solar analytic for each address, a canvas representation for the geographic area.

The embodiments disclosed herein also include a system for generating canvas representations of solar panel installation potential in a geographic area. The system comprises: a processing unit; and a memory, the memory containing instructions that, when executed by the processing unit, configure the system to: identify, based on at least one location parameter, a plurality of addresses, wherein the at least one location parameter represents a geographic area including the plurality of addresses; extract an image of a geographic area including the plurality of addresses; cause a determination of an installation layout for the plurality of addresses based on the extracted image; cause a generation of at least one solar analytic for each of the plurality of addresses based on the determined installation layout; and generate, based on the installation layout and the at least one solar analytic for each address, a canvas representation for the geographic area.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
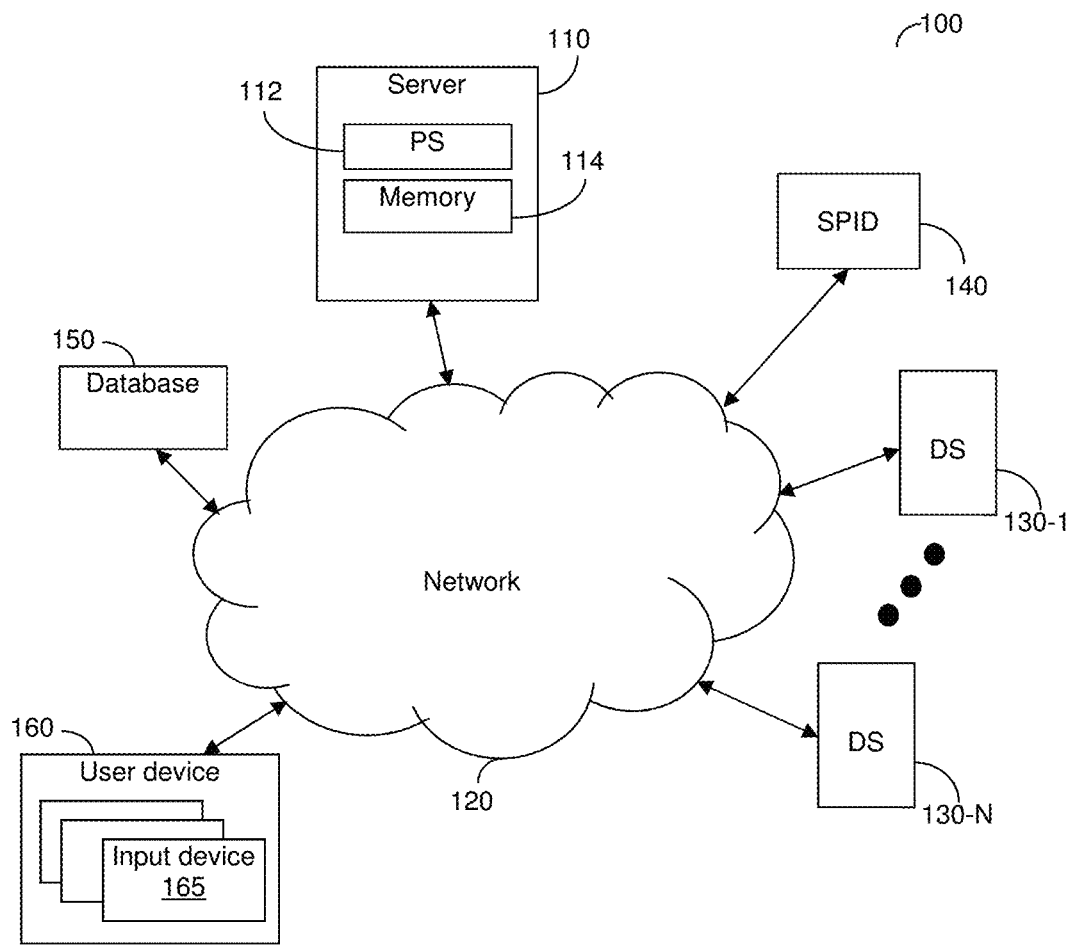
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for generating canvas representations reflecting potential solar installation addresses in a geographic area. Location parameters are received. Based on the location parameters, a plurality of addresses are identified. Images including the identified addresses are retrieved. Based on the retrieved images, an installation layout of potential solar panels for each address is determined and solar analytics are generated for each address. Based on the installation layouts and solar analytics, a canvas representation illustrating solar analytics for the installation layouts is generated and displayed.

FIG. 1 shows an example network diagram 100 utilized to illustrate the various disclosed embodiments. The network diagram 100 includes a server 110, a plurality of data sources (DSs) 130-1 through 130-n (hereinafter referred to individually as a data source 130 and collectively as data sources 130, merely for simplicity purposes), a solar potential installation detector (hereinafter "SPID") 140, and a database 150 communicatively connected via a network 120. The network 120 may be, but is not limited to, a wireless, cellular or wired network, a local area network (LAN), a wide area network (WAN), a metro area network (MAN), the Internet, the worldwide web (WWW), similar networks, and any combination thereof.

Each of the data sources 130 may be, but is not limited to, a server configured to collect location information for a geographic area such as, but not limited to, images of maps, address data, and the like. The data sources 130 may further collect climate information, energy utilization information (e.g., amounts of energy, costs, etc.), and any other information relevant for generating solar analytics for particular addresses. Address data may be further stored in the database 150.

In various embodiments, a user device 160 may be further connected to the network 120. The user device 160 may be, but is not limited to, a personal computer, a laptop, a tablet computer, a smartphone, a wearable computing device, or any other device configured to receive, send, and display data. The user device 160 may further include one or more input devices 165 such as, but not limited to, a mouse, a keyboard, a touch screen, a microphone and the like.

In an embodiment, the server 110 is configured to receive one or more location parameters as inputs. The inputs may be received via the input devices 165 as, e.g., a query or user gesture. The location parameters represent a geographic location associated with a plurality of addresses. The geographic location may be, but is not limited to, a geographic area inside a particular boundary, a list of individual addresses, combinations thereof, and the like.

The location parameters may be, but are not limited to, administrative boundaries of towns or counties, geographic coordinates, a selection of a particular area on a map representing the geographic location, combinations thereof, and the like. The selected map area may be of a particular shape, e.g., a circular region, a polygonal region (e.g., triangular, rectangular, pentagonal, hexagonal, octagonal, etc.), or any other shape input by a user (e.g., a shape drawn by a user of the user device 160 via interaction with a mouse or touch screen input device 165). Receiving location parameters is described further herein below with respect to FIG. 3A.

In an embodiment, based on the received location parameters, the server 110 is configured to identify a plurality of addresses associated with the geographic area represented by the location parameters. Each address typically represents a particular building and may include, but is not limited to, a street address (e.g., a house number on a street in a particular city, state, and/or country), geographic coordinates, and any other identifier of a particular building or site. In a further embodiment, the addresses may be extracted from one or more of the data sources 130 using the location parameters.

In an embodiment, the server 110 is configured to extract or otherwise retrieve images based on the plurality of addresses. In a further embodiment, the images include an image for each address. The images may be retrieved from, e.g., the data source 130.

In another embodiment, the server 110 may be configured to retrieve supplemental information such as, but not limited to, meteorological information, financial information, solar panel information, or a combination thereof, with respect to each of the plurality of addresses. The meteorological information may include, but is not limited to, radiation data. The financial information may include, but is not limited to, system costs for solar panel systems, incentives, utility rates, consumer consumption patterns, and the like. The solar panel information may include, but is not limited to, a number of panels that may be installed on the roof, a Kilowatt Peak (KWp) value for solar panels on the roof, panel directions, a tilt of the roof, and the like.

In an embodiment, based on the retrieved meteorological information, the server 110 may be configured to determine, for each address, one or more sunlight parameters related to evaluation of solar panel effectiveness such as, but not limited to, time periods of sunshine, strength of sunlight, and so on. Information retrieved and utilized to determine the sunlight parameters may include, but are not limited to, maps of the addresses, sun path maps, weather condition maps, digital terrain models, combinations thereof, and the like.

In an embodiment, the server 110 is configured to send at least the extracted images to the SPID 140 for analysis. In another embodiment, the server 110 may also send the sunlight parameters for each address to the SPID 140. In a further embodiment, the server 110 may be configured to cause the SPID 140 to generate solar analytics for each of the addresses.

The SPID 140 is configured to analyze either or both of the extracted images and the sunlight parameters to determine an installation layout of solar panels that can potentially be installed at each address. Further, the SPID 140 may be configured to generate solar analytics for each address based on the determined installation layout. The SPID 140 is configured to send the generated solar analytics to the server 110. The solar analytics may be generated further based on, but not limited to, the analysis of the images, the supplemental information, a combination thereof, and the like.

The solar analytics may include, but are not limited to, a maximum system size (e.g., a number of panels multiplied by the KWp value for each panel), a maximum potential electricity production (e.g., in KWh), an estimated annual savings for the consumer, an estimated lifetime savings, an estimated time for return on investment, an internal rate of return, a shading level, combinations thereof, and the like. The maximum potential electricity production may be based on supplemental information such as, but not limited to, maximum system size, panel directions, sun radiation at the address, shading, roof tilt, and combinations thereof. The estimated annual savings may be based on supplemental information such as, but not limited to, system cost, incentives, utility rates, consumer consumption patterns, and combinations thereof.

The server 110 is configured to receive the generated solar analytics and to generate a canvas representation based on one or more of the solar analytics. The canvas representation indicates solar analytics with respect to each corresponding address using one or more indicators for each address. The indicators may be numeric, alpha-numeric, text-based, color-based, shape-based, combinations thereof, or any other graphical representation or combination of graphical representations. To this end, the canvas representation may be a graphical representation (e.g., an image visually illustrating the indicators), a textual representation (e.g., an alphanumeric spreadsheet), or a combination of graphical and textual representation.

In various embodiments, different values of the solar analytics may be represented by indicators including different types, colors, shapes, values, words, characters, combinations thereof, and the like. As a non-limiting example, a triangular indicator, a circular indicator, and a rectangular indicator may be used to a high value, a medium value, and a low value, respectively. As another non-limiting example, different colors of indicators may be used to designate different values, with colors on one end of the spectrum (e.g., red and orange) representing higher values and colors on the other end of the spectrum (e.g., violet and indigo) representing lower values. To this end, the canvas representation may further include a legend or key illustrating the associations of indicators with particular colors, shapes, words, letters, numbers, and so on.

The canvas representation allows for organization, based on the solar analytics, of addresses via, e.g., filtering, ordering, highlighting, combinations thereof, and the like. For example, the canvas representation may highlight addresses with the highest solar potential (e.g., as determined based on maximum system size or maximum electricity production) by displaying the indicators associated with the highlighted addresses, by displaying indicators associated with the highlighted addresses in a different color or shape, or otherwise visually distinguishing the indicators associated with the highlighted addresses. An example canvas representation is discussed further herein below with respect to FIG. 3B.

In an embodiment, the server 110 may be configured to overlay the canvas representation on an image of the geographic area and to send the image with the overlaid canvas representation for display on, for example, a display (not shown) of the user device 160. The overlaid image may be utilized to evaluate potential for installation of solar panels at particular addresses of a geographic area.

In various embodiments, the server 110 may be configured to send one or more of the solar analytics associated with a particular address based on interactions with the canvas representation. In a further embodiment, interactions with particular addresses (by, e.g., clicking or touching an indicator associated with the address) may be utilized to determine a selection of one or more addresses. The interactions may be based on, e.g., user inputs. As an example, based on a user of the user device 160 clicking on an indicator associated with a particular address, a selection of that address may be determined. In response to determining the selection of the address, the server 110 may be configured to send, to the user device 160, the solar analytics. In a further embodiment, the server 110 may be configured to cause, on the user device 160, a display of the solar analytics associated with the selected one or more addresses.

The server 110 typically includes a processing system (PS) 112 coupled to a memory 114. The processing system 112 may comprise or be a component of a processor (not shown) or an array of processors coupled to the memory 114. The memory 114 contains instructions that can be executed by the processing system 112. The instructions, when executed by the processing system 112, cause the processing system 112 to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

It should be noted that the embodiments described herein above with respect to FIG. 1 are described with respect to the server 110 being communicatively connected to the SPID 140 over the network 120 merely for simplicity purposes and without limitation on the disclosed embodiments. The server 110 may include or may be included in the SPID 140 without departing from the scope of the disclosure.

Figure 2:
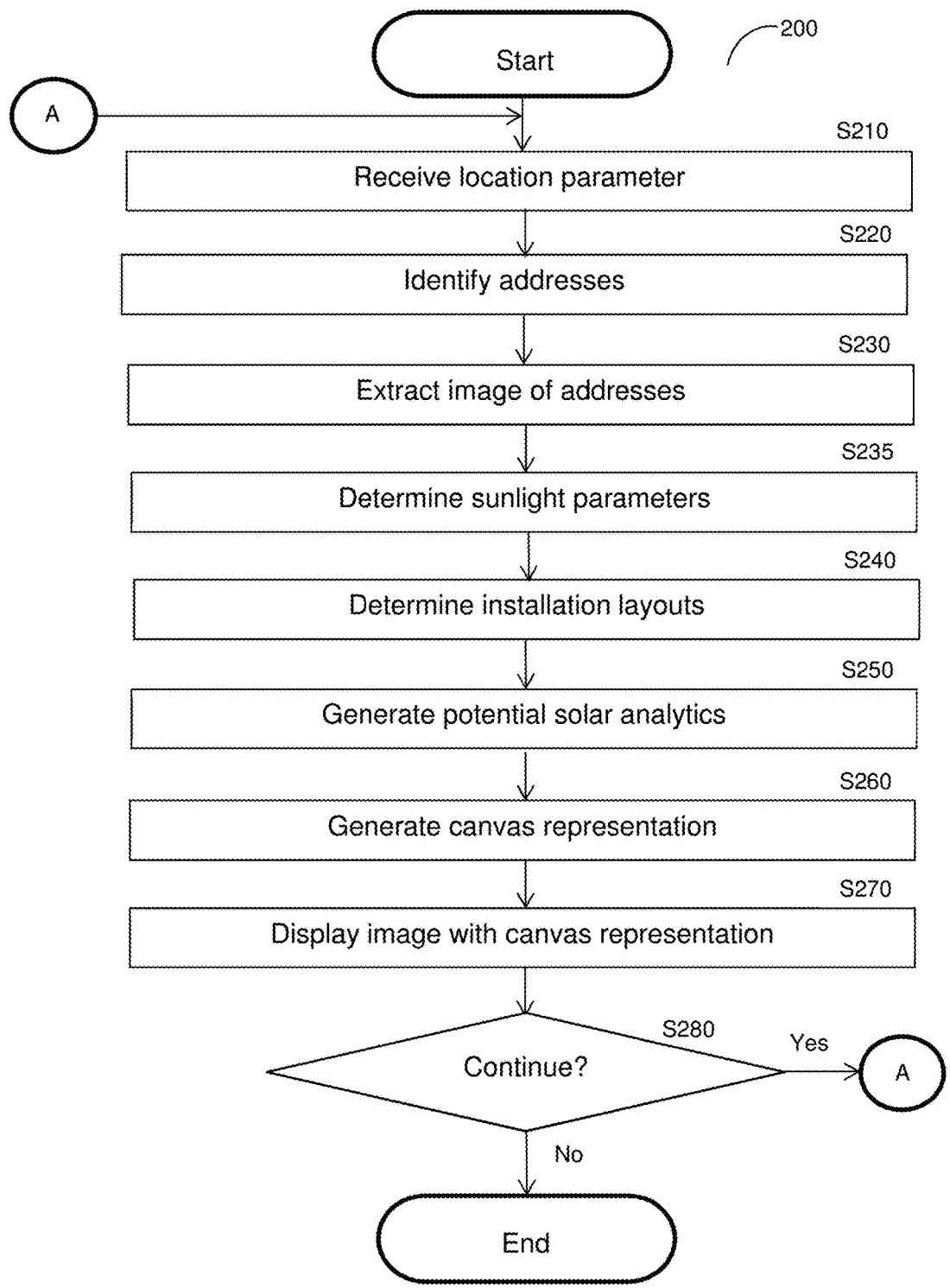
FIG. 2 is a flowchart illustrating a method for generating and displaying solar analytics as a canvas representation over a geographic area according to an embodiment.

FIG. 2 is an example flowchart 200 illustrating a method for generating and displaying a canvas representation for potential solar panel installations at a plurality of addresses according to an embodiment. In an embodiment, the method may be performed by a server (e.g., the server 110) including or communicatively connected to a detector (e.g., the SPID 140).

At S210, one or more location parameters is received. The location parameters may be received via user interactions with, e.g., one or more input devices of a user device. The location parameters represent a geographic area associated with a plurality of addresses. The geographic area may be, but is not limited to, a geographic area inside a particular boundary, a list of individual addresses, combinations thereof, and the like. The location parameters may be, but are not limited to, administrative boundaries of towns or counties, geographic coordinates, a selection of a particular area on a map representing the geographic area, combinations thereof, and the like. Selecting location parameters via a map is described further herein below with respect to FIG. 3A.

At S220, a plurality of addresses is identified based on the location parameters. Each address may include, but is not limited to, a street address (e.g., a house number on a street in a particular city, state, and/or country), geographic coordinates, and the like. In an embodiment, the addresses may be extracted from one or more data sources using the location parameters.

At S230, one or more images, each image including any or all of the identified addresses, is retrieved. The images may include, but are not limited to, two dimensional images, three dimensional images, combinations thereof, and the like. In an embodiment, the images include a two dimensional overhead image of each address.

In a further embodiment, S230 may further include retrieving supplemental information such as, but not limited to, meteorological information, financial information, solar panel information, or a combination thereof, with respect to each of the plurality of addresses of the geographic area.

At optional S235, for each address, one or more sunlight parameters related to evaluation of solar panel effectiveness may be determined. The sunlight parameters may include but are not limited to, time periods of sunshine, strength of sunlight, and so on. Information retrieved and utilized to determine the sunlight parameters may include meteorological information related to any or all of the plurality of addresses. The meteorological information may include, but is not limited to, radiation data.

At S240, determination of installation layouts of potential solar panels for the addresses is caused. Determination of the installation layouts may be caused via, e.g., a detector (e.g., the solar panel installation detector 140). In an embodiment, the determination may be caused via, e.g., sending, to the detector, the image including the addresses. In a further embodiment, S240 may include sending, to the detector, the determined sunlight parameters, the retrieved supplemental information, or a combination thereof. Determining installation layouts is described further herein below with respect to FIG. 5.

At S250, generation of solar analytics based on the determined installation layouts is caused. Generating the solar analytics may be caused via, e.g., the detector. In an embodiment, S250 may further include receiving, from the detector, the generated solar analytics.

At S260, based on the generated solar analytics, a canvas representation indicating the solar analytics for each address is generated. The canvas representation may include, but is not limited to, one or more indicators, a legend or key, combinations thereof, and so on. The indicators may be numerical, alphanumerical, text-based, color-based, shape-based, combinations thereof, or any other geographic representation or combination of geographic representations.

At optional S270, a display of the canvas representation may be caused. In an embodiment, S270 may further include overlaying the image of the addresses with the canvas representation. In another embodiment, the canvas representation may further allow for organizing the addresses based on solar analytics via, e.g., filtering, ordering, highlighting, combinations thereof, and the like.

At S280, it is checked whether additional location parameters have been received and, if so, execution continues with S210; otherwise execution terminates. In an embodiment, multiple overlaid images, each having a canvas representation, may be combined to generate a combined overlaid image showing canvas representations for various geographic areas. The combined overlaid image may be interacted with (e.g., by zooming in or out, moving, rotating, etc.).

Figure 3A:
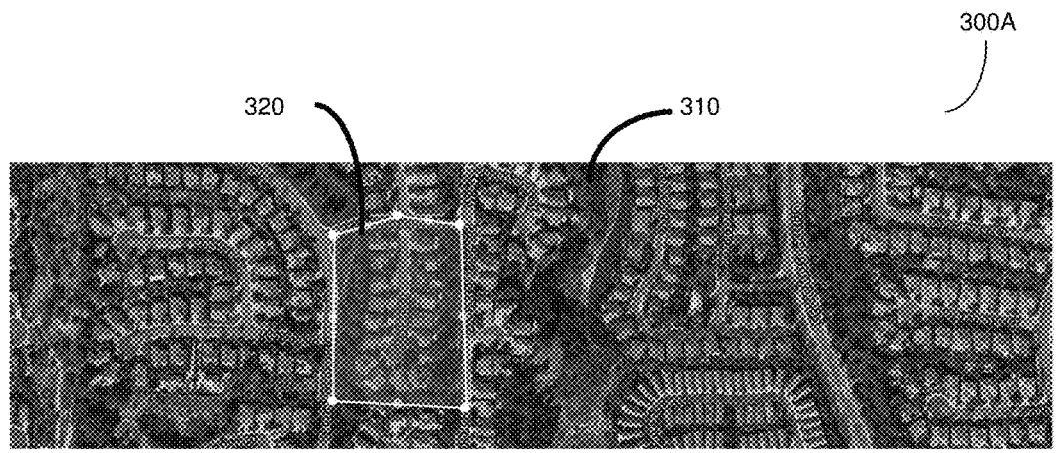
FIG. 3A is a simulation illustrating selecting a geographic area for which solar analytics will be calculated.

FIG. 3A illustrates an example simulation 300A of a selection of a geographic area for which a canvas representation may be desired. The simulation 300A shows an overhead image 310 with a selected geographic area 320. The overhead image 310 may be displayed via, e.g., a display on a user device. The selected geographic area 320 may be selected via, e.g., one or more user inputs received by the user device (e.g., a scroll, a press, a response, etc.). For example, a user may select the geographic area 320 by touching a touch screen, thereby drawing a boundary along the perimeter of the geographic area 320.

Figure 3B:
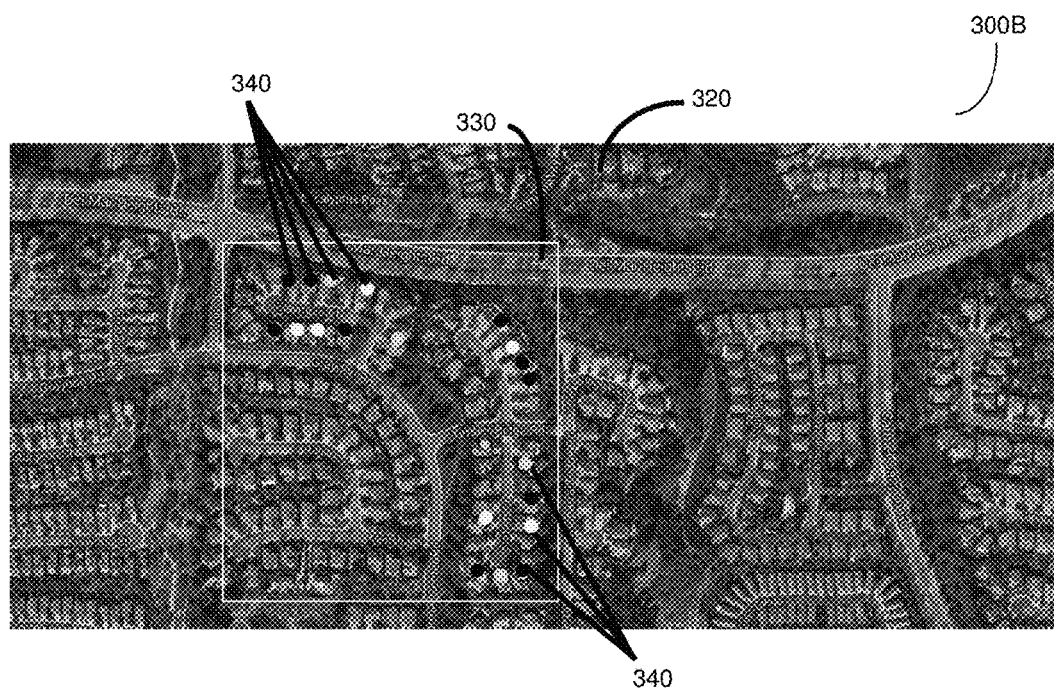
FIG. 3B is a simulation illustrating a canvas representation of solar analytics over a geographic area.

FIG. 3B illustrates an example simulation 300B of a canvas representation overlaid on the overhead image 310 and, in particular, over the geographic area 320. The simulation 300B includes a canvas representation 330 displayed as an overlay over the geographic area 320 in the image 310 as well as a plurality of indicators 340. In the example simulation 300B, the indicators 340 are circular indicators associated with various colors, where each color represents a high, low, or medium value for a particular solar analytic.

Figure 4:
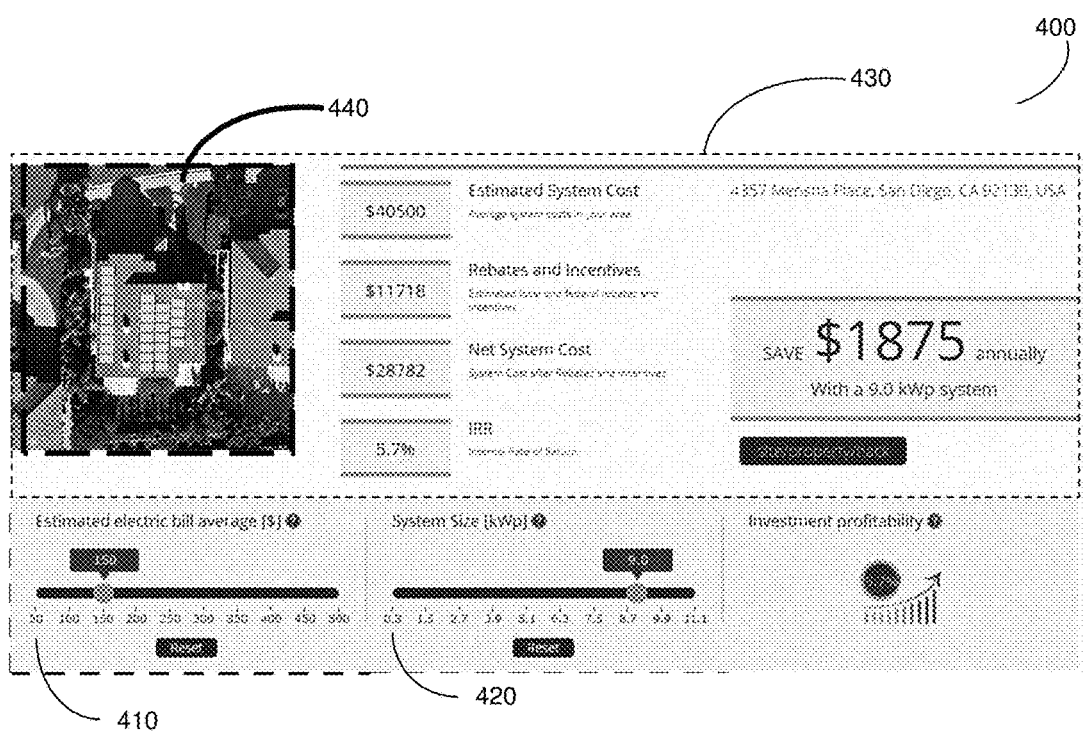
FIG. 4 is an interface illustrating an installation layout and solar analytics.

FIG. 4 is an example interface 400. The example interface 400 includes selection fields 410 and 420, a solar analytics field 430, as well as an installation layout 440. The selection field 410 allows for selection an estimated average electric bill given estimated energy consumption. The selection field 420 allows for selection of an average system size expressed in kilowatt peak (kWp) for solar panels in the geographic area illustrated in the installation layout 440. The solar analytics fields 430 indicates various solar analytics data given the selections made in the selection fields 410 and 420. In the example interface 400, the solar analytics data includes an estimated system cost, an internal rate of return on investment, tax rebates, and a simulated size of the solar panel system.

Figure 5:
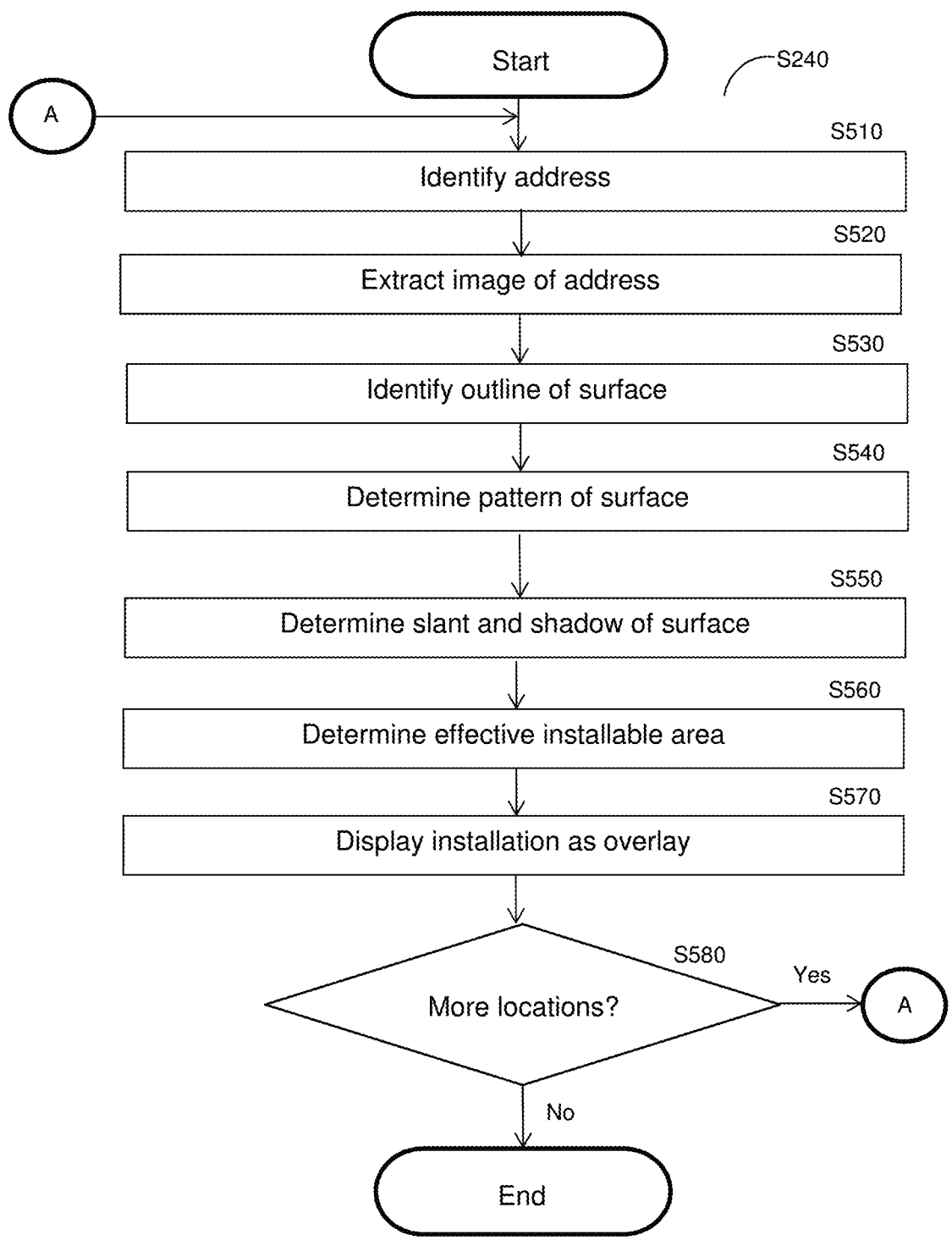
FIG. 5 is a flowchart illustrating a method for determining installation layouts according to an embodiment.

FIG. 5 depicts an example flowchart S240 illustrating a process for determining installation layout solar panels according to an embodiment. At S510, an address for potential installation of solar panels is identified. The address may be identified based on, e.g., a, geographic coordinates, a combination thereof, and so on. An address may include, but is not limited to, a street address (e.g., a house number on a street in a particular city, state, and/or country), geographic coordinates, and the like.

At S520, an image of the address is extracted, for example from a data source (e.g., the data source 130). In an embodiment, the image may be, but is not limited to, a two-dimensional overhead image. Such an overhead image may allow for automatically determining a potential surface for installation of solar panels and, therefore, efficient identification of good potential addresses for placing their solar panels, and the overall potential of the surface.

At S530, an outline of at least a surface in the address is identified. At S535, a pattern associated with the at least a surface that is amenable for installation of a solar panel structure is determined. The pattern includes at least a facet.

At S540, a slant of the surface is identified. In an embodiment, a shadow associated with an object that is located at or near the address is identified, and the relative height of the surrounding objects can be determined respective thereto. Based on the size of the area contained in the image, the actual height can be calculated based on the relative height. Determining relative height of an object based on its shadow is described further in related U.S. patent application Ser. No. 14/626,300, assigned to the common assignee, which is hereby incorporated by reference.

At S545, a potential surface for installation of solar panels is determined, taking into account, for example, shade created by objects on or near the surface, position of the solar panels to be installed, and the like.

At optional S550, an overlay of the installation potential area for solar panels that is associated with the surface may be displayed as an overlay over the extracted image. At S560, it is checked whether additional addresses for potential positions of solar panels have been identified and, if so, execution continues with S510; otherwise, execution terminates.

Figure 6:
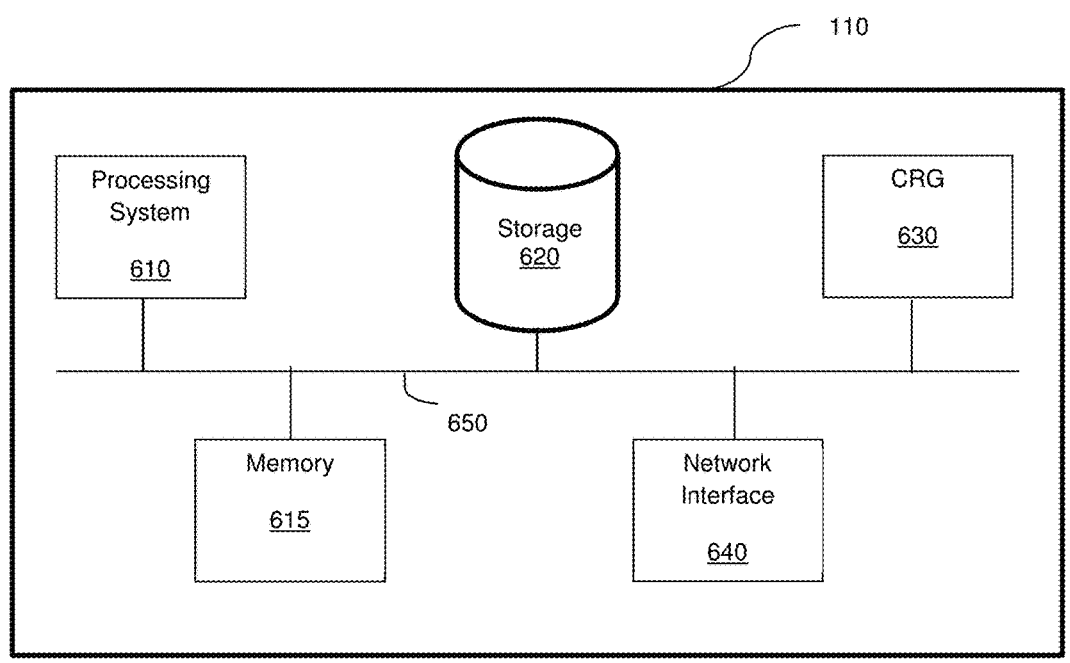
FIG. 6 is a schematic diagram illustrating a server for generating and displaying canvas representations of solar analytics over a geographic area according to an embodiment.

FIG. 6 is an example schematic diagram illustrating the server 110 according to an embodiment. In the example schematic diagram, the server 110 includes a processing system 610 coupled to a memory 615, a storage 620, a canvas representation generator (CRG) 630, and a network interface 640. In an embodiment, the components of the server 110 may be connected via a bus 650.

The processing system 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 615 may be volatile (e.g., RAM, etc.), non-volatile (e.g., ROM, flash memory, etc.), or a combination thereof. In one configuration, computer readable instructions to implement one or more embodiments disclosed herein may be stored in the storage 620.

In another embodiment, the memory 615 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 410 to perform the various processes described herein. Specifically, the instructions, when executed, cause the processing system 610 to generate canvas representations of solar installation potential in a geographic area, as discussed hereinabove.

The storage 620 may be magnetic storage, optical storage, and the like, and may be realized, for example, as flash memory or other memory technology, CD-ROM, Digital Versatile Disks (DVDs), or any other medium which can be used to store the desired information.

The canvas representation generator 630 is configured to generate a canvas representation of a geographic area based on installation layouts and solar analytics for addresses of the geographic area. The canvas representation may be, but is not limited to, a graphical representation of the geographic area, an alphanumeric representation of the solar analytics, a combination thereof, and the like.

The canvas representation generator 630 may be further configured to generate an indicator for each address in the geographic area. The indicator for an address may be generated based on one or more of the solar analytics for the address, with different types, shapes, colors, strings, characters, and numerical values of indicators associated with different solar analytics. For example, different shapes of indicators may be associated with different values of a particular solar analytic or different relative descriptors (e.g., high, medium, low) of the solar analytic.

In a further embodiment, generating the canvas representation may further include associating each indicator with the solar analytics of the address corresponding to the indicator. Upon selection of an address via the canvas representation (e.g., via user interactions with the corresponding indicator displayed on the user device 160 as part of the canvas representation), the canvas representation generator 630 may be configured to send one or more of the solar analytics of the selected address to the user device 160.

In an embodiment, the canvas representation generator 630 is realized as a processing system discussed above.

The network interface 640 allows the server 110 to communicate with the user device 160 for the purpose of, for example, receiving user inputs related to selections of geographic areas, sending generated canvas representations, sending images with overlaid canvas representations, combinations thereof, and the like. Additionally, the network interface 640 allows the server 110 to communicate with the database 150, one or more of the data sources 130, or a combination thereof, to retrieve address data, location information, supplemental information, and the like.

It should be understood that the embodiments described herein are not limited to the specific architecture illustrated in FIG. 6, and other architectures may be equally used without departing from the scope of the disclosed embodiments.

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating canvas representations of solar panel installation potential in a geographic area, comprising:
   identifying, based on at least one location parameter, a plurality of addresses, wherein the at least one location parameter represents a geographic area including the plurality of addresses;
   extracting an image of a geographic area including the plurality of addresses;
   causing a determination of an installation layout for the plurality of addresses based on the extracted image;
   causing a generation of at least one solar analytic for each of the plurality of addresses based on the determined installation layout; and
   generating, based on the installation layout and the at least one solar analytic for each address, a canvas representation for the geographic area.

2. The method of claim 1, further comprising:
   organizing, via the canvas representation, the plurality of addresses based on the solar analytics, wherein the organizing includes at least one of: filtering, highlighting, and ordering.

3. The method of claim 1, further comprising:
   determining, based on the extracted image, the installation layout;
   generating, based on the installation layout, the at least one potential solar analytic for each address; and
   receiving the installation layout and the plurality of potential solar analytics.

4. The method of claim 1, further comprising:
   overlaying the generated canvas representation on the extracted image.

5. The method of claim 4, further comprising:
   sending the image having the overlaid canvas representation for display on a user device.

6. The method of claim 5, further comprising:
   sending at least one solar analytic associated with a selected address of the plurality of addresses, when the selected address is selected via the user device.

7. The method of claim 6, wherein the canvas representation includes at least one indicator, wherein each indicator is associated with one of the plurality of addresses.

8. The method of claim 7, wherein the selected address is determined based on at least one user interaction with the user device.

9. The method of claim 1, wherein the canvas representation is at least one of: a graphical representation, and a textual representation.

10. A non-transitory computer readable medium having stored thereon instructions for causing one or more processing units to execute the method according to claim 1.

11. A system for generating canvas representations of solar panel installation potential in a geographic area, comprising:
   a processing unit; and
   a memory, the memory containing instructions that, when executed by the processing unit, configure the system to:
   identify, based on at least one location parameter, a plurality of addresses, wherein the at least one location parameter represents a geographic area including the plurality of addresses;
   extract an image of a geographic area including the plurality of addresses;
   cause a determination of an installation layout for the plurality of addresses based on the extracted image;
   cause a generation of at least one solar analytic for each of the plurality of addresses based on the determined installation layout; and
   generate, based on the installation layout and the at least one solar analytic for each address, a canvas representation for the geographic area.

12. The system of claim 11, wherein the system is further configured to:
   organize, via the canvas representation, the plurality of addresses based on the solar analytics, wherein the organizing includes at least one of: filtering, highlighting, and ordering.

13. The system of claim 11, wherein the system is further configured to:
   determine, based on the extracted image, the installation layout;
   generate, based on the installation layout, the at least one potential solar analytic for each address; and
   receive the installation layout and the plurality of potential solar analytics.

14. The system of claim 11, wherein the system is further configured to:
   overlay the generated canvas representation on the extracted image.

15. The system of claim 14, wherein the system is further configured to:
   send the image having the overlaid canvas representation for display on a user device.

16. The system of claim 15, wherein the system is further configured to:
   send at least one solar analytic associated with a selected address of the plurality of addresses, when the selected address is selected via the user device.

17. The system of claim 16, wherein the canvas representation includes at least one indicator, wherein each indicator is associated with one of the plurality of addresses.

18. The system of claim 17, wherein the selected address is determined based on at least one user interaction with the user device.

19. The system of claim 11, wherein the canvas representation is at least one of: a graphical representation, and a textual representation.

* * * * *